H. J. SCHMICK.
GEARING.
APPLICATION FILED JUNE 2, 1920.

1,384,543.

Patented July 12, 1921.

Inventor
Henry J. Schmick
By Emery, Booth, Janney & Varney
his Attorneys

UNITED STATES PATENT OFFICE.

HENRY J. SCHMICK, OF WILLIAMSPORT, PENNSYLVANIA, ASSIGNOR TO SCHMICK SCREW AND GEAR COMPANY, OF WILMINGTON, DELAWARE, A CORPORATION OF DELAWARE.

GEARING.

1,384,543. Specification of Letters Patent. Patented July 12, 1921.

Application filed June 2, 1920. Serial No. 386,060.

*To all whom it may concern:*

Be it known that I, HENRY J. SCHMICK, a citizen of the United States, and a resident of Williamsport, Pennsylvania, county of Lycoming, have invented an Improvement in Gearing, of which the following description, in connection with the accompanying drawings, is a specification, like characters on the drawings representing like parts.

This invention aims to improve the strength, smooth running qualities and efficiency of gearing of the spiral or helical type, peripherally grooved cams, and other shaped rotatory members.

The principles underlying the invention are illustrated in the accompanying drawings in connection with a typical embodiment of the invention shown therein.

Figure 1:
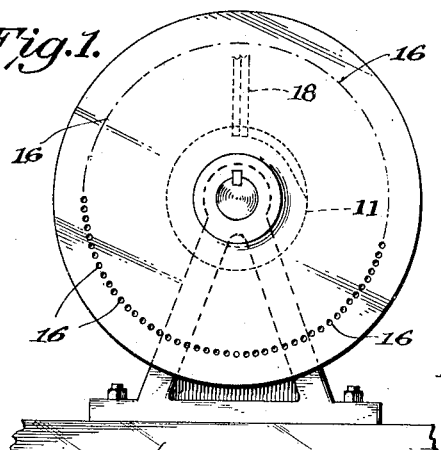
Figure 2:
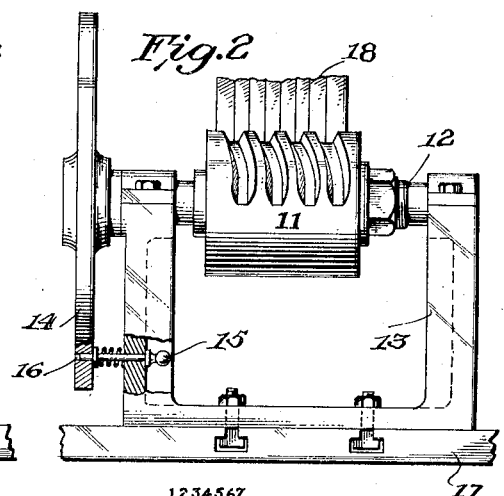
Figure 3:
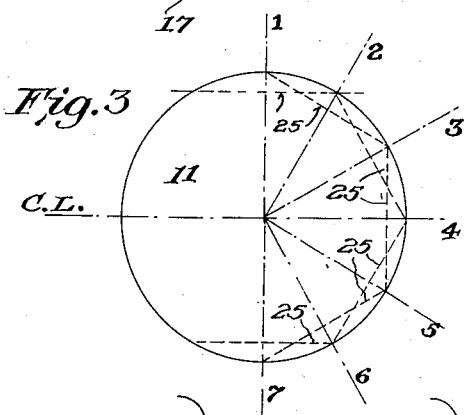
Figure 4:
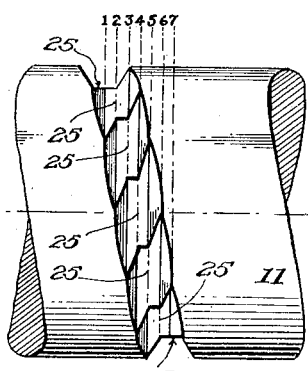
Figures 5, 6:
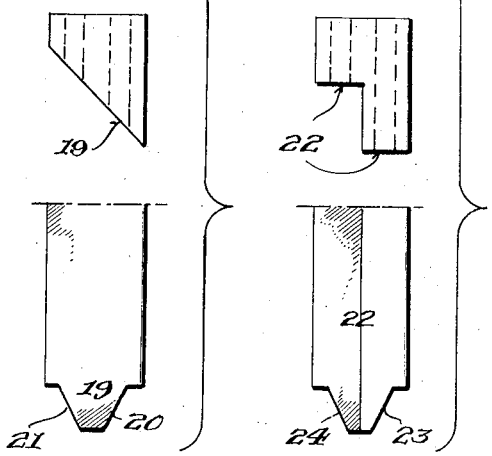

In the drawings, Figures 1 and 2 are an end view and a side view, respectively, of suitable apparatus for producing a form of gear embodying the invention;

Figs. 3 and 4 are diagrams illustrating the character of the shape and the relative position of successive cuts in the formation of a gear embodying the invention;

Fig. 5 includes top and front views of a cutting tool suitable for producing gears, cams and other grooved articles embodying the invention;

Fig. 6 includes similar views of a modified form of cutting tool, and

Figure 7:
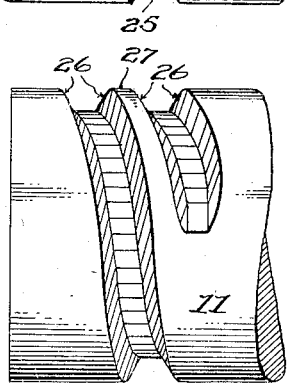

Fig. 7 is a side view of a partly finished gear embodying the invention.

The usual forms of spiral gearing, peripherally grooved cams and other shaped bodies with surfaces turning around an axis are commonly composed of linear elements usually intersecting the axis if sufficiently extended.

In articles embodying this invention, the working faces are composed of narrow plane surfaces intersecting in lines which may or may not be symmetrically disposed about the axis of rotation, depending upon the nature of the article.

A suitable method and machine for producing articles embodying the invention is disclosed in my application for U. S. patent filed April 29, 1920, Serial Number 377,638, for art of forming gear teeth and the like; but any suitable method or machine may be used, such for example, as that illustrated in Figs. 1 and 2 herein.

In forming a worm gear of my improved type, such as is illustrated in the accompanying drawings, the gear blank 11 may be mounted on an arbor 12 which is journaled in bearings in a suitable frame 13 and has an index plate 14 fixed on one end, whereby the gear blank may be turned through successive small angles and secured in each angular position by means of the pin 15 working in the series of holes 16 in the index plate.

The frame, carrying the work arbor and index mechanism, may be mounted upon the table or bed 17 of a planer or other suitable machine beneath the cutter 18 which is mounted in an overhanging part of the machine. The cutter and frame are adjustable with respect to each other both vertically and crosswise of the table, and are relatively movable back and forth lengthwise of the machine so as to get a relative movement of approach in a straight line between the cutter and work transversely of the axis of rotation of the work. The frame is preferably arranged with the axis of the work arbor substantially at right angles to the direction of the cut.

The side cutting edges of each tooth of the cutter 18 are preferably set one in advance of the other, as shown in Figs. 5 and 6. In the form shown in Fig. 5, the cutting face 19 of the tooth is inclined at an angle of 45° to the direction of cut, so that the side cutting edges 20, 21 are displaced lengthwise of the cut. In the form shown in Fig. 6, the cutting face 22 of the tooth is made in two vertically extending sections, one in advance of the other, so that the side cutting edges 23, 24 are in parallel planes displaced lengthwise of the cut.

Between successive cuts the index mechanism is operated to cause successive segments of the work blank to be presented to the tool, and simultaneously therewith the blank and tool are given a relative lateral or sidewise movement of the tool axially of the blank to cause the successive cuts to be displaced slightly lengthwise of the blank, as shown in Figs. 3 and 4, thereby forming a stepped groove on the blank encircling it transversely of its longitudinal axis, and leading toward one or the other end depending upon the direction and relative width of the lateral spacing between successive cuts. For convenience only seven successive cuts 25 are shown in the diagrams (marked on their center lines 1 to 7 in each figure) to a half circumference of the gear. In practice the number of cuts would be much greater in order to secure a smooth working face.

If more than one thread or groove is to be formed the axial displacement of the successive cuts must be increased in proportion to the number of threads. In the article shown, the cutter 18 has four teeth, whereby four grooves are cut at once, thereby forming four threads or curved teeth on the blank. The number of cutters may be greater or less than the number of threads to be cut, as desired, provided they are spaced at the proper distances apart to conform to the lateral displacement of successive turns of the groove. The working faces 26 of the finished teeth 27 (see Fig. 7) are slightly convex though formed with a cutter having straight sided cutting teeth.

The relative angular displacement of the successive cuts around the work blank and their relative sidewise displacement lengthwise of the axis of the blank, the shape of the cutter and the depth of cut, may be varied to suit the form of working face, pitch, lead and number of threads or grooves desired. Reference may be made to my pending application for U. S. patent, filed April 16, 1920, Serial Number 374,468, for further explanation of the principles underlying the character and spacing of the cuts.

This invention is not restricted to the form of gear nor to the shape of working face shown in the accompanying drawings, nor to the apparatus and method herein described.

I claim the following as my invention:

1. A member having an axis of rotation and a peripheral groove with side walls which comprise a series of angularly spaced elementary plane surfaces extending transversely of the axis of rotation and successively spaced in the direction lengthwise of the axis.

2. A rotary member having a series of overlapping straight cuts in its perimeter transverse to the axis of said member, said cuts being axially spaced whereby they merge into a spiral groove.

3. A rotary member having a groove extending spirally around its axis of rotation formed by angularly spaced straight crosswise cuts overlapping sidewise.

4. A gear having curved teeth extending spirally with working faces composed of successive narrow flat strips overlapping both radially and circumferentially.

5. A gear having curved teeth extending spirally with working faces composed of successive narrow flat strips overlapping radially.

6. A gear having curved teeth extending spirally with working faces composed of successive narrow flat strips overlapping circumferentially.

7. A working face for a gear tooth, cam groove and other rotary members, having an approximately convex shape combining a series of narrow flat strips crossing from inner to outer edge at a constant angle to the axis.

8. A working face for a gear tooth, cam groove and other rotary members, having an approximately convex shape combining a series of narrow strips composed of straight elements extending transversely of the axis of rotation, said strips crossing from inner to outer edge of the working face.

9. In gearing, cams, and the like, a working face comprising narrow plane surfaces extending inward from the outer periphery and intersecting in non-radial lines inclined to axial planes through their intersections with the outer periphery of the working face.

10. A stepped groove for a worm gear, cylindrical cam and the like, having side walls shaped to straight parallel lines extending transversely of the axis and crossing the walls on one side of the groove from outer to inner circumference and from inner to outer circumference on the other side of the groove.

11. A worm gear having teeth provided with working faces composed of pairs of oppositely inclined sectors, the sectors of each pair being non-radial and disposed on opposite sides of the axis of rotation in series forming twisted surfaces.

12. A worm gear having teeth formed by shaping their sides in opposite series of groups of non-radial parallel straight elements, said groups being uniformly spaced circumferentially and axially and overlapping radially.

In testimony whereof, I have signed my name to this specification.

HENRY J. SCHMICK.